United States Patent Office 2,892,830
Patented June 30, 1959

2,892,830
TRIAZINE MONOAZO DYESTUFFS

William Elliot Stephen, Manchester, England, assignor to Imperial Chemical Industries Limited, London, England, a corporation of Great Britain No Drawing. Application November 25, 1955
Serial No. 549,179

Claims priority, application Great Britain
November 29, 1954

6 Claims. (Cl. 260—153)

This invention relates to new monoazo dyestuffs and more particularly it relates to new monoazo dyestuffs, which are valuable for the production of fast reddish-yellow to reddish-orange colourations on cellulosic textile materials.

In United Kingdom specification No. 209,723 there is described the manufacture of azo dyestuffs by synthesising dyestuffs containing one or more cyanuric nuclei (1) by uniting together or with other suitable components by reactions which lead to the formation of azo dyestuffs, intermediate products containing one or more cyanuric nuclei or (2) by uniting azo dyestuffs containing appropriate groupings, either to each other or to other complexes, radicals or suitable residues by reaction with the halogen of cyanuric halides.

In the said specification there are described azo dyestuffs wherein there are attached to the triazine ring two chlorine atoms and a substituted phenylazonaphthyl-amino group. These dyestuffs may be obtained by the reaction of one molecular proportion of cyanuric chloride with one molecular proportion of an aminonaphthol sulphonic acid and subsequent reaction of the product with a diazo compound, for example the diazo compound from aniline or p-toluidine, or alternatively may be obtained by reaction of one molecular proportion of cyanuric chloride with one molecular proportion of the amino-azo compound formed by reaction of the said aminonaphtholsulphonic acid with the said diazo compound.

In the said specification there are also disclosed azo dyestuffs wherein there are attached to the triazine ring two chlorine atoms and a nuclear substituted phenylazo-anilino group. These dyestuffs may be obtained by reaction of one molecular proportion of cyanuric chloride with one molecular proportion of an aminoazo compound formed by reaction of one molecular proportion of a substituted aniline for example o-anisidine with one molecular proportion of a diazo compound of the benzene series for example 1-diazobenzene-3-sulphonic acid.

There are no dyestuffs disclosed in the said specification however, wherein there are attached to the triazine ring two chlorine atoms and a naphthyl-azoanilino group containing sulphonic acid group in the naphthalene nucleus.

We have found that certain monoazo dyestuffs of this kind containing two chlorine atoms attached to the triazine ring and also a naphthylazoanilino group containing sulphonic acid group in the naphthalene nucleus, which dyestuffs are represented by the formula below, have superior tinctorial value and superior fastness to wet treatments, as compared with monoazo dyestuffs of comparable shade specifically mentioned in United Kingdom specification No. 209,723, containing only one chlorine atom attached to the triazine ring, and superior fastness to light compared with monoazo dyestuffs of comparable shade specifically mentioned in United Kingdom specification No. 209,723 which contain two chlorine atoms attached to the triazine ring but which do not contain the sulphonaphthyl-azo-anilino group, when the dyestuffs are applied to cellulosic textile materials by a process which comprises impregnating the said textile materials with the dyestuff in aqueous solution and subsequently subjecting the textile material to the action of an acid binding agent in aqueous medium for a short period of time, of the order only of a few minutes, advantageously in the presence of an electrolyte such as sodium chloride or sodium sulphate.

Furthermore, the said dyestuffs represented by the formula below have a superior solubility in water compared with the monoazo dyestuffs of comparable shade which are specifically described in United Kingdom specification No. 209,723, and which contain two chlorine atoms attached to the triazine ring and in consequence yield more level colourations on cellulosic textile materials when applied by the said process of impregnation followed by the treatment with an acid-binding agent.

According to our invention we provide new monoazo dyestuffs which in the form of their free acids are of the formula:

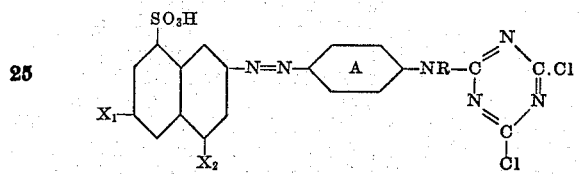

wherein the benzene nucleus A may optionally bear further substituents other than —OH and —NH$_2$ groups, R stands for a hydrogen atom or for an alkyl radical, and X$_1$ and X$_2$ are such that one of the groups X$_1$ and X$_2$ stands for a hydrogen atom and the other stands for the group —SO$_3$H.

According to our invention we also provide a process for the manufacture of the said new monoazo dyestuffs which comprises reacting an aminoazo compound which in the form of its free acid is of the formula:

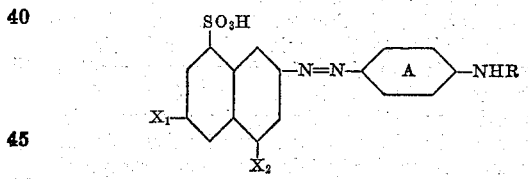

wherein R, X$_1$ and X$_2$ have the meaning stated above and the benzene nucleus A may optionally contain further substituents other than hydroxyl and amino groups with one molecular proportion of cyanuric chloride.

As aminoazo compounds suitable for use in the process of our invention there may be mentioned for example the products obtained by diazotising 2-naphthylamine-4:8-disulphonic acid or 2-naphthylamine-6:8-disulphonic acid and coupling the diazo compound thus formed with a primary or secondary aromatic amine of the benzene series which contains a coupling position in a position para with respect to the primary or secondary amino group, and which may optionally contain other substituents other than hydroxy or amino groups.

As examples of primary aromatic amines which may be thus coupled there may be mentioned aniline, o-toluidine, m-toluidine, 2:5-dimethylaniline, o-anisidine, m-anisidine, 3-amino-4-methoxytoluene and 2:5-dimethoxyaniline. As examples of secondary aromatic amines there may be mentioned N-methylaniline, N-methyl-o-toluidine, N-methyl-m-toluidine, N-ethylaniline, N-ethyl-o-toluidine, N-ethyl-m-toluidine, N-methylcresidine, N-ethylcresidine, N-methyl-m-anisidine and N-ethyl-m-anisidine.

The diazotisation of the said naphthylamine sulphonic acids may be carried out according to known procedures, and the diazo compounds thus formed may be coupled with the said primary or secondary aromatic amines for example in aqueous acid medium.

The aminoazo compounds for use in the process of our invention may also be obtained by coupling the diazo compound, formed by diazotising one of the said naphthylamine sulphonic acids, with the N-(ω-sulphomethyl) derivatives of the primary or secondary aromatic amine in acid medium and subsequently removing the N-(ω-sulphomethyl) groups by hydrolysis in alkaline medium.

The reaction of the said aminoazo compound with one molecular proportion of cyanuric chloride may be carried out for example and preferably in aqueous medium and preferably at a temperature below 5° C. When the rate of reaction of the aminoazo compound with cyanuric chloride is slow as for example when the aminoazo compound used is the product obtained by diazotising 2-naphthylamine-4:8-disulphonic acid and coupling with N-ethyl-m-toluidine or by diazotising 2-naphthylamine-4:8-disulphonic acid and coupling with N-ethyl cresidine, then more than one molecular proportion of cyanuric chloride may be used in order to ensure complete reaction of the aminoazo compound.

In order that side reactions, for example hydrolysis, of the chlorine atoms remaining attached to the triazine ring, are minimised during manufacture and storage, it is generally preferable to isolate the new dyestuffs from the media in which they have been formed at a pH from 6 to 8, and to dry the resultant dyestuff pastes at relatively low temperatures, for example between 20° C. and 40° C., preferably in the presence of buffering agents suitable for maintaining a pH value of about 6.5. Examples of such buffering agents are mixtures of disodium hydrogen phosphate and sodium dihydrogen phosphate or of disodium hydrogen phosphate and potassium dihydrogen phosphate.

The dyestuffs of this invention in the form of their alkali metal salts are readily soluble in water and are especially suitable for application to cellulosic textile materials by a process which comprises impregnating the said textile materials in aqueous medium with the dyestuff and thereafter subjecting the textile materials, optionally after drying, to the action of an acid binding agent for example caustic soda, in aqueous medium which advantageously contains an electrolyte such as sodium chloride or sodium sulphate, for a short period of time, commonly of the order only of a few minutes, at temperatures conveniently lying between atmospheric temperature and the temperature of the boiling solution and also for the printing of cellulosic textile materials by a process which comprises applying thereto a printing paste containing the dyestuff and a substance which on heating or steaming liberates an acid-binding agent, for example sodium bicarbonate, and subsequently subjecting the textile material to the action of heat or steam. The reddish-yellow to reddish-orange colourations thus produced possess a high degree of fastness to light and to wet treatments, especially to repeated washing.

When the dyestuffs of this invention applied to cellulose by these processes contain an alkyl group as represented by R in the general formula shown above the dyeings or prints obtained have the desirable property of showing little change of shade when spotted with solutions of alkalies.

The invention is illustrated but not limited by the following examples in which the parts are by weight:

*Example 1*

A solution of 18.5 parts of cyanuric chloride in 105 parts of acetone is poured into a stirred mixture of 250 parts of water and 250 parts of ice, at a temperature below 5° C. A solution in 500 parts of water at 30° C. of 46.5 parts of the disodium salt of the compound obtained by diazotising 2-naphthylamine-4:8-disulphonic acid and coupling the diazo compound thus formed with m-toluidine is added during 75 minutes to the aqueous suspension of cyanuric chloride obtained as described above. The mixture is stirred for a further 20 minutes and then a 2 N aqueous solution of sodium carbonate is added during 30 minutes at such a rate that the mixture is maintained slightly acid to litmus. At the end of this time the mixture is rendered slightly alkaline to litmus by the addition of more sodium carbonate solution. 140 parts of sodium chloride are added, and the mixture is stirred for 30 minutes, and is then filtered and the solid residue is washed with 10% brine and dried at 20–45° C.

The product dissolves in water with a reddish-orange colouration and dissolves in concentrated sulphuric acid with a red colouration. When applied in aqueous solution to cellulosic materials, for example cotton, by padding, and the material is dried at 20° C. to 40° C., and is then immersed for 1 minute at 95° C. in a 3% aqueous solution of caustic soda containing 20% sodium chloride, the product yields bright reddish-yellow colourations possessing very good fastness to light, to washing and to soda boiling treatments.

*Example 2*

A solution of 18.5 parts of cyanuric chloride in 105 parts of acetone is poured into a stirred mixture of 400 parts of ice and 400 parts of water. A solution in 900 parts of water at 15° C. to 20° C. of 46.5 parts of the disodium salt of the compound obtained by diazotising 2-naphthylamine-6:8-disulphonic acid and coupling the diazo compound thus obtained with m-toluidine is added during 40 minutes to the stirred aqueous suspension of cyanuric chloride, obtained as described above, while the temperature of the mixture is maintained below 5° C. The mixture is stirred at a temperature below 5° C. for a further 90 minutes and then 2 N aqueous sodium carbonate solution is added gradually during 30 minutes at such a rate that the reaction medium is maintained slightly acid to litmus. At the end of this time, the mixture is rendered slightly alkaline to litmus by the further addition of 2 N sodium carbonate solution. Sufficient sodium chloride to give a concentration of 100 grams per litre is dissolved in the mixture, which is then stirred for 30 minutes and filtered. The residual solid is washed on the filter with 10% brine and dried at 20° C. to 45° C.

The product dissolves in water with a reddish-orange colouration and in concentrated sulphuric acid with a red colouration. When cotton is padded with an aqueous solution of it and then dried and aftertreated with a solution of caustic soda containing salt at 95° C., reddish yellow colourations are obtained which are very resistant to severe washing and soda boiling and have very good light fastness.

*Example 3*

46.5 parts of the disodium salt of the compound obtained by diazotising 2-naphthylamine-6:8-disulphonic acid, coupling the diazo compound thus obtained with N-(ω-sulphomethyl)-o-toluidine and subsequently hydrolysing the N-(ω-sulphomethyl) group are dissolved in 700 parts of water and the resulting solution at 15° C. to 20° C. is poured, with stirring, during 30 minutes into an aqueous suspension of cyanuric chloride obtained as described in Example 2. The mixture is then stirred at a temperature between 0° C. and 4° C. for 3 hours and during this period a 2 N aqueous solution of sodium carbonate is gradually added at such a rate that the reaction medium is maintained slightly acid to litmus. At the end of this time the mixture is rendered slightly alkaline to litmus by the further addition of 2 N sodium carbonate solution. 260 parts of sodium chloride are added to the mixture which is then stirred for 30 minutes and filtered. The residual solid is washed with 15% brine and dried at a temperature between 20° C. and 45° C.

The product dissolves in water with a reddish-yellow colouration and dissolves in concentrated sulphuric acid with a yellowish-scarlet colouration. By padding cotton with an aqueous solution of it and aftertreating the dried padded material with a brine solution containing caustic soda at 95° C. Yellow colourations are obtained which have very good fastness to light and to severe washing and soda boiling.

Example 4

51.1 parts of the disodium salt of the compound obtained by diazotising 2-naphthylamine-4:8-disulphonic acid and coupling the diazo compound thus obtained with 2:5-dimethoxyaniline is dissolved in 2000 parts of water and the resulting solution at 15° C. to 20° C. is poured, with stirring, into a suspension of cyanuric chloride obtained as described in Example 2 while the temperature of the mixture is kept below 4° C. After the addition is complete the mixture is stirred for 30 minutes and then sodium carbonate solution is gradually added during the following 30 minutes until the mixture reacts and remains slightly alkaline to glazed red litmus paper. 700 parts of salt are added and the mixture is stirred for another 30 minutes at a temperature between 0° and 4° C. and then is filtered. The solid on the filter is mixed thoroughly with 4.2 parts of anhydrous disodium hydrogen phosphate and 7.5 parts of anhydrous potassium dihydrogen phosphate and dried at 20° C. The product dissolves in water with a reddish orange colouration and dissolves in sulphuric acid with a bluish red colouration. When applied in aqueous solution to cellulosic materials, for example cotton, by padding and the material is dried and then immersed for 1 minute at 95° C. in an aqueous solution containing from 6 to 15% caustic soda and saturated with sodium chloride, and afterwards rinsed with hot water and then treated in a boiling solution containing 0.3% of an alkyl phenol-ethylene oxide condensate, the product gives colourations possessing good fastness to light and very good fastness to washing and to soda boiling.

If in the procedure of this example the 51.1 parts of the disodium salt of the compound obtained by coupling diazotised 2-naphthylamine-4:8-disulphonic acid with 2:5-dimethoxyaniline are replaced by 48.1 parts of the disodium salt of the compound obtained by coupling diazotised 2-naphthylamine-4:8-disulphonic acid with o-anisidine, there is obtained a product which dissolves in water with an orange-yellow colouration and in sulphuric acid with an orange-red colouration and when applied to cellulosic materials by the method already described in this example gives yellow shades much greener than those given by the dyestuff described in Example 1 which also show high resistance to severe washing and soda boiling and very good fastness to light.

Example 5

49.5 parts of the disodium salt of the compound formed by coupling diazotised 2-naphthylamine-4:8-disulphonic acid with cresidine in known manner are dissolved in 800 parts of water at 60° C. and the resulting solution is cooled to 25° C. and added during 45 minutes to a stirred suspension of cyanuric chloride prepared as described in Example 2. The mixture is kept at a temperature between 0° and 4° C. and is stirred for 15 minutes and then in the next 90 minutes the acidity which has developed in it is preferably neutralised with sodium carbonate solution until the aqueous medium reacts alkaline to glazed red litmus paper. Sufficient salt is then added to given a concentration of 100 grams per litre, and the mixture is stirred for 15 minutes more and is then filtered. The solid residue on the filter is washed with a 10% aqueous solution of salt, and then is mixed with 1.4 parts of anhydrous disodium hydrogen phosphate and 2.5 parts of anhydrous potassium dihydrogen phosphate and dried at 20–25° C. The product dissolves in water and in sulphuric acid to give solutions which are coloured yellow and bluish-red respectively.

When in the procedure of the above example the disodium salt of the compound obtained by coupling diazotised 2-naphthylamine-4:8-disulphonic acid with cresidine is replaced by the same quantity of the disodium salt of the compound formed by coupling diazotised 2-naphthylamine-6:8-disulphonic acid with cresidine, a less soluble product is formed which begins to separate from the aqueous reaction medium during the neutralisation with sodium carbonate. Accordingly, less salt (sufficient to give a concentration of 50 grams per litre) is required to salt out the dyestuff which remains dissolved at the end of the reaction. This dyestuff gives yellow and bluish-red solutions in water and sulphuric acid respectively and each of the dyestuffs described in this example when applied to cotton by padding with an aqueous solution and then aftertreating the padded cloth, optionally dried, with an aqueous solution of an alkali containing common salt, under a variety of conditions, gives reddish yellow colourations having very good fastness to severe washing, soda boiling and to light.

Example 6

A solution of 18.6 parts of cyanuric chloride in 100 parts of dry acetone is poured into a stirred mixture of 250 parts of water and 250 parts of crushed ice and there is added to the suspension formed in 30 minutes a solution in 340 parts of water at 20° C. of 35 parts of the disodium salt of the compound obtained by coupling diazotised 2-naphthylamine-4:8-disulphonic acid with N-ethylcresidine in the presence of sodium acetate. The mixture is stirred for 1 hour, while maintained at a temperature between 0° and 3° C. During the next 2 hours a solution of 5.2 parts of sodium carbonate in water is added at such a rate that the mixture is kept neutral to glazed red litmus paper. The mixture is filtered to remove any unreacted cyanuric chloride and sufficient salt is added to the filtrate to give a concentration of 200 grams per litre of solution, and the mixture is filtered again. The solid thus obtained is washed with acetone and is then dried at 20–25° C. The product dissolves in water with a yellow colouration and in sulphuric acid with a red colouration.

When in place of the aminoazo compound in the process of the above example there is used an equivalent amount of the disodium salt of the product formed by coupling diazotised 2-naphthylamine-4:8-disulphonic acid with N-ethyl-m-toluidine, there is obtained a similar dyestuff which dissolves in water with a yellow colouration and in sulphuric acid with an orange colouration.

Both the dyestuffs described in this example when applied to cellulosic materials, for example cotton, by padding with aqueous solutions of the dystuffs, preferably also containing sodium sulphate to inhibit migration of the dyestuff in the fabric, and subsequently drying the padded material and after-treating it with a solution of alkali, for example caustic soda also containing sodium chloride, give reddish yellow dyeings with very good fastness to severe washing and soda boiling, and good fastness to light and which show only slight change of shade when spotted with solutions of alkalies.

What I claim is:
1. Monoazo dyestuffs having the free acid formula

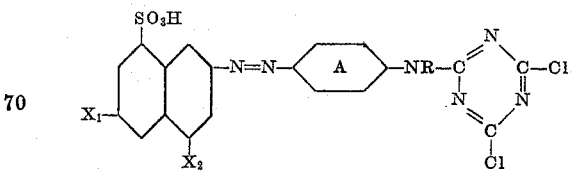

wherein R is selected from the group consisting of hydrogen and lower alkyl radicals, ring A is selected from the group consisting of phenylene and non-ionic group substituted phenylene radicals, $X_1$ and $X_2$ are selected from the group consisting of hydrogen and —$SO_3H$, provided that only one of $X_1$ and $X_2$ is an —$SO_3H$.

2.

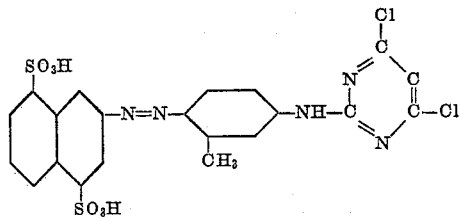

3.

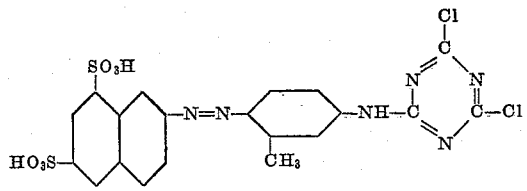

4.

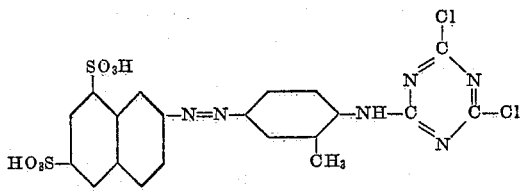

5.

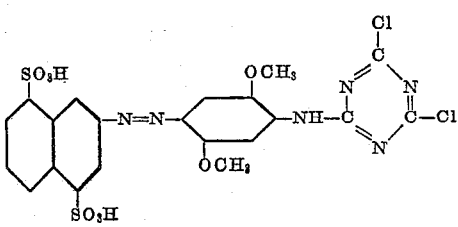

6.

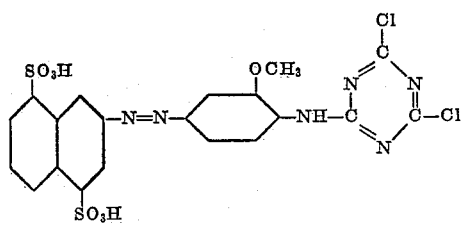

References Cited in the file of this patent

UNITED STATES PATENTS

| | | |
|---|---|---|
| 1,667,312 | Fritzsche et al. | Apr. 24, 1928 |
| 1,802,208 | Hoffa et al. | Apr. 21, 1931 |
| 1,886,480 | Haller et al. | Nov. 8, 1932 |
| 2,000,121 | Bush | May 7, 1935 |
| 2,093,424 | Dove | Sept. 21, 1937 |
| 2,339,739 | Blackshaw et al. | Jan. 18, 1944 |
| 2,384,283 | Conrad et al. | Sept. 4, 1945 |
| 2,722,527 | Wehrli et al. | Nov. 1, 1955 |

OTHER REFERENCES

Chem. Abs., vol. 44, p. 1711 (1950).
Venkataraman: Synthetic Dyes, 1952, p. 461.